INVENTOR.
CECIL E. ADAMS
BY
Herschel C. Omohundro
attorney

Feb. 16, 1954     C. E. ADAMS     2,669,226
INTERMITTENTLY ROTATABLE DEVICE WITH SERVO CONTROL
Filed May 13, 1952     4 Sheets-Sheet 2

INVENTOR.
CECIL E. ADAMS
BY
Herschel C. Omohundro
attorney

Feb. 16, 1954
C. E. ADAMS
2,669,226
INTERMITTENTLY ROTATABLE DEVICE WITH SERVO CONTROL
Filed May 13, 1952
4 Sheets-Sheet 3
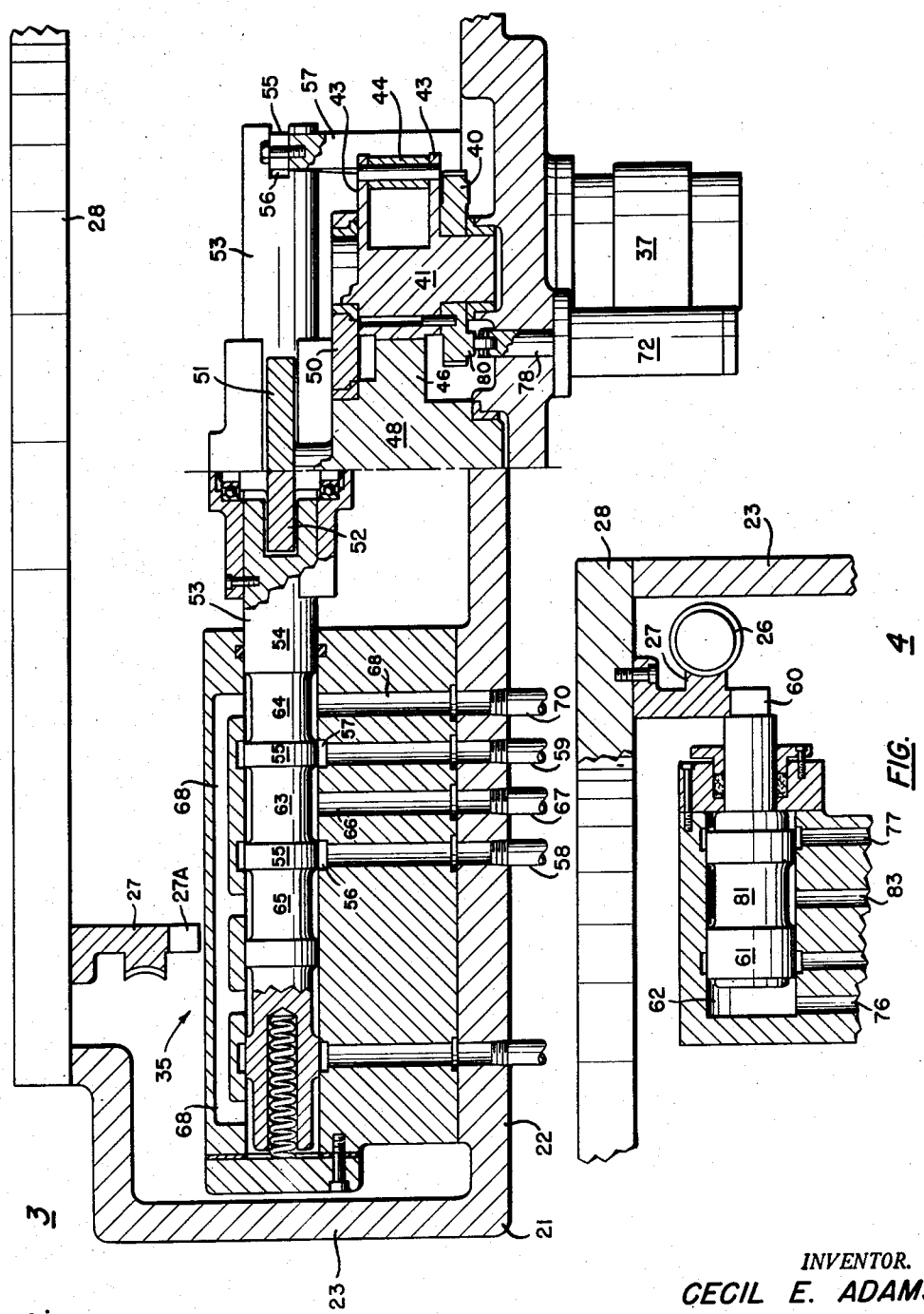
INVENTOR.
CECIL E. ADAMS
BY
Herschel C. Omohundro
attorney Feb. 16, 1954  C. E. ADAMS  2,669,226
INTERMITTENTLY ROTATABLE DEVICE WITH SERVO CONTROL
Filed May 13, 1952  4 Sheets-Sheet 4

INVENTOR.
CECIL E. ADAMS
BY
Herschel C. Omohundro
attorney

Patented Feb. 16, 1954

2,669,226

UNITED STATES PATENT OFFICE 2,669,226

INTERMITTENTLY ROTATABLE DEVICE WITH SERVO CONTROL

Cecil E. Adams, Columbus, Ohio, assignor to The Denison Engineering Company, Columbus, Ohio, a corporation of Ohio Application May 13, 1952, Serial No. 287,450

11 Claims. (Cl. 121—39)

1

This invention relates generally to hydraulics and more particularly to hydraulically operated machinery having an intermittently operated device either of the rotary or linear moving type.

This application is a continuation-in-part of my copending application Serial No. 270,131, filed February 6, 1952, for Pilot Control Mechanism for Hydraulic Apparatus.

An object of this invention is to provide an intermittently operated device having a prime mover, a pilot operating mechanism, this pilot operating mechanism having means for intermittently moving an element and control means for the prime mover of the device, this control means being operated in response to changes in relative rates of movement of one member intermittently driven by the pilot operating mechanism and another member driven by the prime mover.

Another object of the invention is to provide a hydraulically operated index table having a fluid motor for driving the same through a worm and worm wheel and pilot means for governing the operation of the fluid motor, this pilot means including a pilot motor, a control valve mechanism, a train of gears driven in part by the fluid motor and in part by an intermittent driving mechanism operated by the pilot motor, the valve mechanism being in turn responsive to changes in rates of rotation of certain of the gears in said train.

Another object of the invention is to provide a hydraulic system including one or more pumps, a plurality of fluid motors and a plurality of distributing valve mechanisms, one of such valves being operated directly by one fluid motor and the other being responsive to changes in rates of rotation between elements driven by the fluid motors.

Another object of the invention is to provide the hydraulic system mentioned in the previous paragraph with safety devices to interrupt or relieve fluid pressure in the event failure should occur in the mechanism operated by the hydraulic system.

A more specific object is to provide an index table having a fluid motor with a worm drive between the motor and the table, a pilot mechanism for such motor, this pilot mechanism including a pilot motor, a Geneva drive operated directly by the pilot motor, this drive serving to intermittently rotate one gear of a train of gears, another of such gears being rotated in unison with the table and a third gear being supported for floating movement between the other gears, the third gear being connected to operate a valve mechanism to control fluid flow to the index table, the third gear being responsive to relative rates of rotation of the first and second gears to effect movement of the valve mechanism.

Further objects and advantages of the present invention will be apparent from the following description, reference being had to the accompanying drawings wherein a preferred form of embodiment of the invention is clearly shown.

In the drawings:

Fig. 3 is a detail sectional view taken through the table on the plane indicated by the line III—III of Fig. 1.

Fig. 4 is also a detail sectional view taken through a portion of the mechanism shown in Fig. 1 on the plane indicated by the line IV—IV of this figure.

Figure 1:
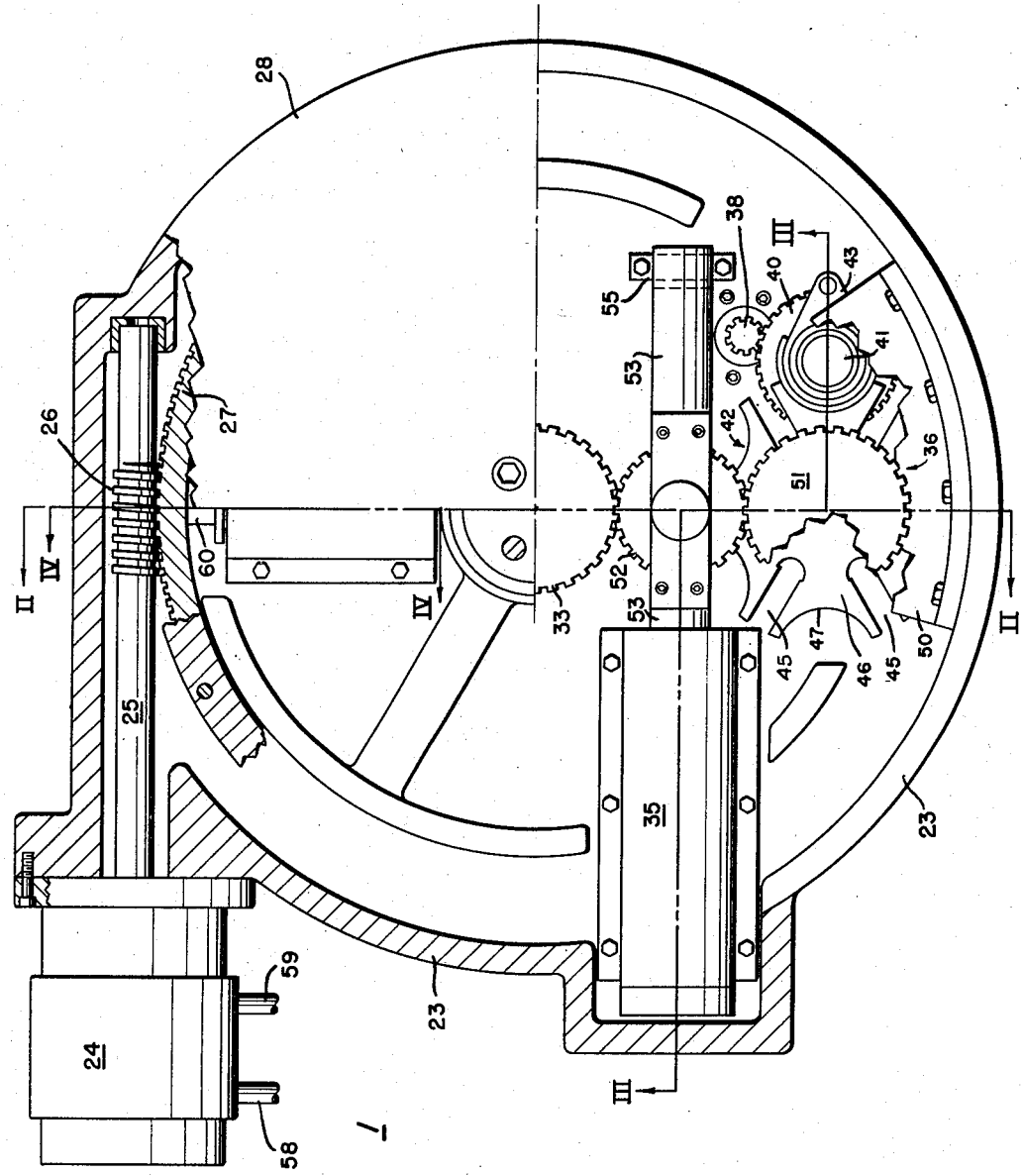
Fig. 1 is a plan view of an index table formed in accordance with the present invention, parts of the mechanism in this view being broken away to show hidden structure in horizontal section.
Figure 2:
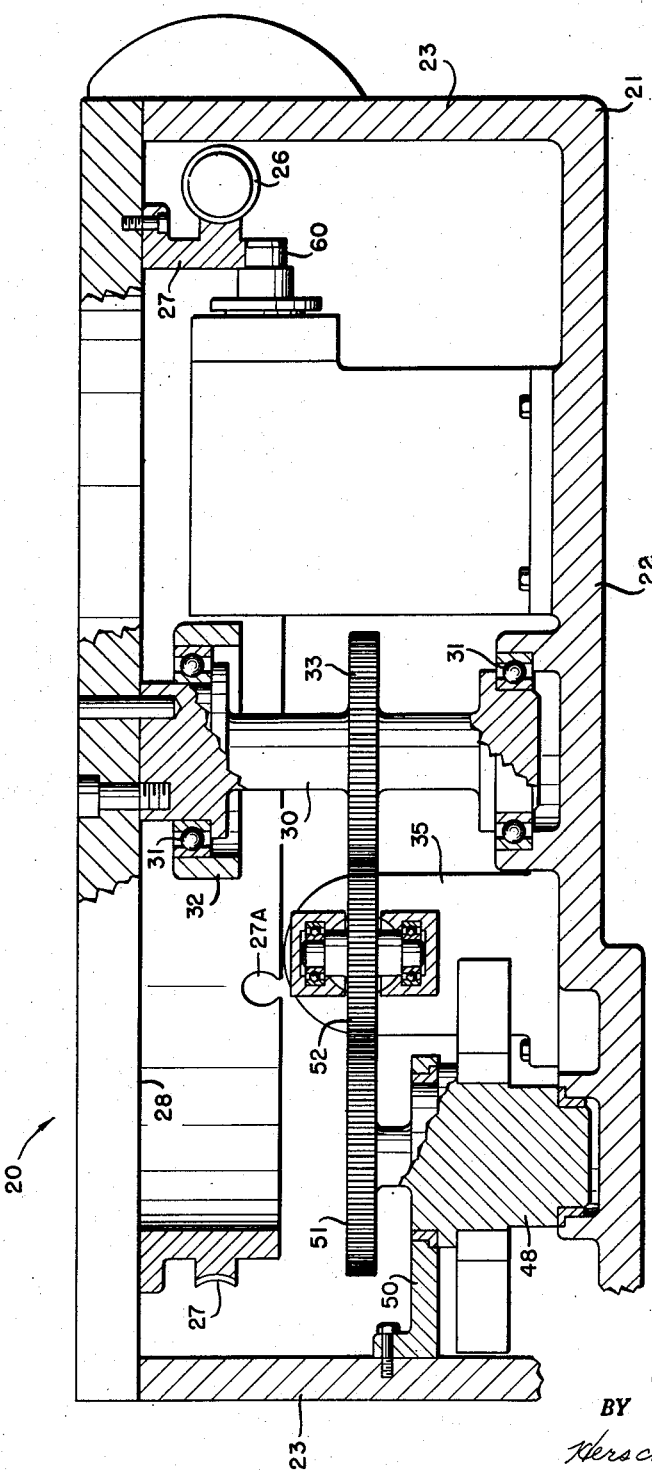
Fig. 2 is a vertical transverse sectional view taken through the table on the plane indicated by line II—II of Fig. 1.

Referring more particularly to the drawings, numeral 20 designates the index table in its entirety. This table includes a base 21 which has a bottom wall 22 and integral side walls 23. The index table embodying this invention may be of any size, however, it is primarily intended to be of considerable size and of relatively rugged construction. One of the features of this invention is to adapt the novel control mechanism of the above-mentioned copending application to such a device. As shown in Fig. 1, the index table has a prime mover 24 which, in the present instance, constitutes a fluid pressure or hydraulic motor. The shaft 25 of this motor is provided with a worm 26 which meshes with a gear 27 carried by the disk-like top 28 of the table. In the present instance, the table top 28 rests upon the upper edge of the side walls 23 and is supported for rotation thereon. The gear 27 constitutes a ring gear and is bolted or otherwise secured to the underside of the table top 28. At its central portion, the table top is supported by a shaft 30 which is journaled in bearings 31 mounted in a boss projecting from the bottom wall and a bracket 32 also suitably supported by the bottom wall. The table top is bolted and dowelled to the shaft 30 so that these members will be rotated in unison. This shaft is provided at 33 with a gear of the spur type. It will be obvious that, when the fluid motor 24 is operated, the worm and gear 26 and 27 will impart rotary motion to the table top which will in turn impart similar movement to the shaft 30 and gear 33.

For governing the flow of fluid under pressure from a fluid source constituting a pump 34 to the fluid motor 24, there is provided a valve mechanism, indicated generally by the numeral 35, and a pilot mechanism indicated generally, in Fig. 1, by the numeral 36. This pilot mechanism also includes a fluid motor 37 for rotating a pinion 38, this pinion meshing with a gear 40 provided on the driver shaft 41 of a Geneva gearing indicated by the numeral 42. Shaft 41 carries a pair of arms 43 which have a roller 44 supported for rotation therebetween. This roller is disposed to enter slots 45 in a star wheel 46 of the Geneva gearing. Between the slots 45, the star wheel is provided with arcuate recesses 47 which receive a portion of the shaft 41, when the roller 44 is not engaged in a slot, to hold the star wheel against rotation. This operation is customary in Geneva gearing.

The star wheel 46 is secured to a shaft 48 which is journaled in the bottom wall 22 and a bracket 50 projecting from the side wall 43. This shaft also carries a gear 51 which is equal in size and pitch to the gear 33. The gears 33 and 51 are spaced, both meshing with an idler gear 52 arranged for floating movement in the space between these gears. The gear 52 is carried by and journaled in bearings secured to a projection 53 on the spool 54 of the valve mechanism 35. The spool and projection are prevented from turning by a bar 55 extending through a slot 56 in the end of the projection 53, the bar 55 being secured to stationary supports 57. Since the idler gear 52 is supported for floating movement between gears 33 and 51, rotary movement on the part of either of those gears at a different rate than that of the other will cause the idler gear to move laterally due to the reaction of this gear on the slower moving gear. This lateral movement will be imparted by the idler gear to the projection 53 and spool 54.

Under normal conditions, the spool is disposed in the position shown in Fig. 3 in which spaced heads 55 register with ports 56 and 57. These ports are connected by lines 58 and 59 with combination inlet and outlet ports on the fluid motor 24. When the spool 54 is in its normal position, no fluid will flow to the fluid motor and it will remain idle, the table being held in this position through the engagement of the worm 26 with the gear 27. The table is maintained in this position also by a bolt 60 carried by a spool 61 which is disposed for movement in a cylinder 62 carried by the base 22. When the bolt is projected, it will be engaged in one of a plurality of slots 27A formed in the lower edge of the ring gear 27. This engagement serves to prevent the rotation of the table during idle periods of motor 24. The spool 54 of the valve mechanism 35 has a groove 63 between the heads 55 and grooves 64 and 65 on opposite sides of such heads from the groove 63. It will be obvious that, if the spool 54 is moved in either direction from its centered position, one of the ports 56 and 57 will be connected with a port 66 which is connected with the pump 34 by a line 67. The other of the ports 56 and 57 will be connected by one of the grooves 64 or 65 with an exhaust port 68, this port being connected by line 70 with the reservoir 71.

In the operation of the table, the motor 37 rotates continuously. Since the gear 38 is driven by the motor 37 and meshes constantly with gear 40, this gear will also rotate continuously causing the driver of the Geneva gearing to do likewise. The gear 51 is intermittently rotated, however, due to the usual operation of the Geneva gearing, the gear 51 rotating with the star wheel 46 when the roller 44 is disposed within a slot 45 in the star wheel. Each time the roller enters a slot 45 in the star wheel and starts to revolve the star wheel and gear 51 the reaction of the rotation of the gear 51 against the idler gear 52, which the gear 33 tends to maintain stationary, will cause this idler gear to move laterally and move the spool 54 in the same direction. When this spool is so moved, one of the ports 56 or 57 will be connected with the source of fluid pressure while the other port is connected with exhaust. Fluid will then be supplied to one of the ports of the fluid motor causing the motor to start to rotate. As previously pointed out, this motor is connected with the table by a worm and worm gear and rotary movement of the motor will cause similar movement on the part of the table.

It has also been previously pointed out that the table is locked when in a stationary position by the bolt 60, therefore, this bolt must be retracted before the table rotation can take place. To effect this operation, there has been provided a valve 72, the inlet port of which is connected with the line 67 while the outlet port is connected by line 73 with the reservoir 71. Valve 72 has a pair of cylinder ports which are connected by lines 74 and 75 with ports 76 and 77 in the cylinder 62. The valve 72 is actuated by a plunger 78 and a cam 80, see Fig. 3, which forms a part of the gear 40. As the gear 40 is revolved, the cam 80 will operate to depress plunger 78 and actuate valve 72. Continued rotation of the gear 40 permits the plunger 78 to be elevated later to shift the valve 72 to another position. In one position of valve 72, fluid from the pump 34 is supplied to line 75 and port 77 to the rod end of the cylinder 62. This fluid will act on the spool 61 to cause it to withdraw bolt 60 from the slot in the ring gear on the table. The cam 80 on gear 40 is so positioned relative to the plunger 78 that valve 72 will be disposed in position to cause the withdrawal of the bolt either just before or simultaneously with the application of fluid to the fluid motor 24. Spool 61 has a groove 81 formed therein, this groove serving to connect spaced ports 83 which communicate with cylinder 62. Ports 83 are connected with sections of line 67 which leads from pump 34 to the valve mechanism 35. When the bolt 60 is projected to prevent the table from rotating, the spool 61 is disposed in a position to prevent fluid flow through the line 67. At this time fluid motor 24 can not be supplied with fluid and will remain idle. This feature constitutes a safety measure since the table is prevented from rotating or having a rotating force applied thereto when the lock provided by bolt 60 is operatively positioned. It will be obvious that, when one end of the cylinder 62 is connected with the source of fluid pressure, the other end thereof will be connected with exhaust.

The valve mechanism 35 is also provided with a safety device in the form of a head 84 which normally blocks a port 85. This port is connected by line 86 with a second line 87 leading from a pump 88 which supplies fluid to the motor 37. Although a separate pump for supplying fluid to the motor 37 has been shown and described, it will be obvious that the fluid under pressure supplied by pump 34 could be utilized without any change in the principles of the invention. Under normal conditions, head 84 will prevent fluid from flowing through line 86 and port 85, however, in the event an undue load or other force should be applied to the index table which might prevent it from rotating and cause excessive lateral movement of the gear 52, spool 54 will be moved far enough to permit head 84 to pass slightly beyond the edge of port 85 permitting this port to be connected, by reduced portions of the spool 54, with the exhaust port 68. When spool 54 is so disposed, the line 86 will be vented to the reservoir and pump 88 will operate under a minimum load.

Figure 5:
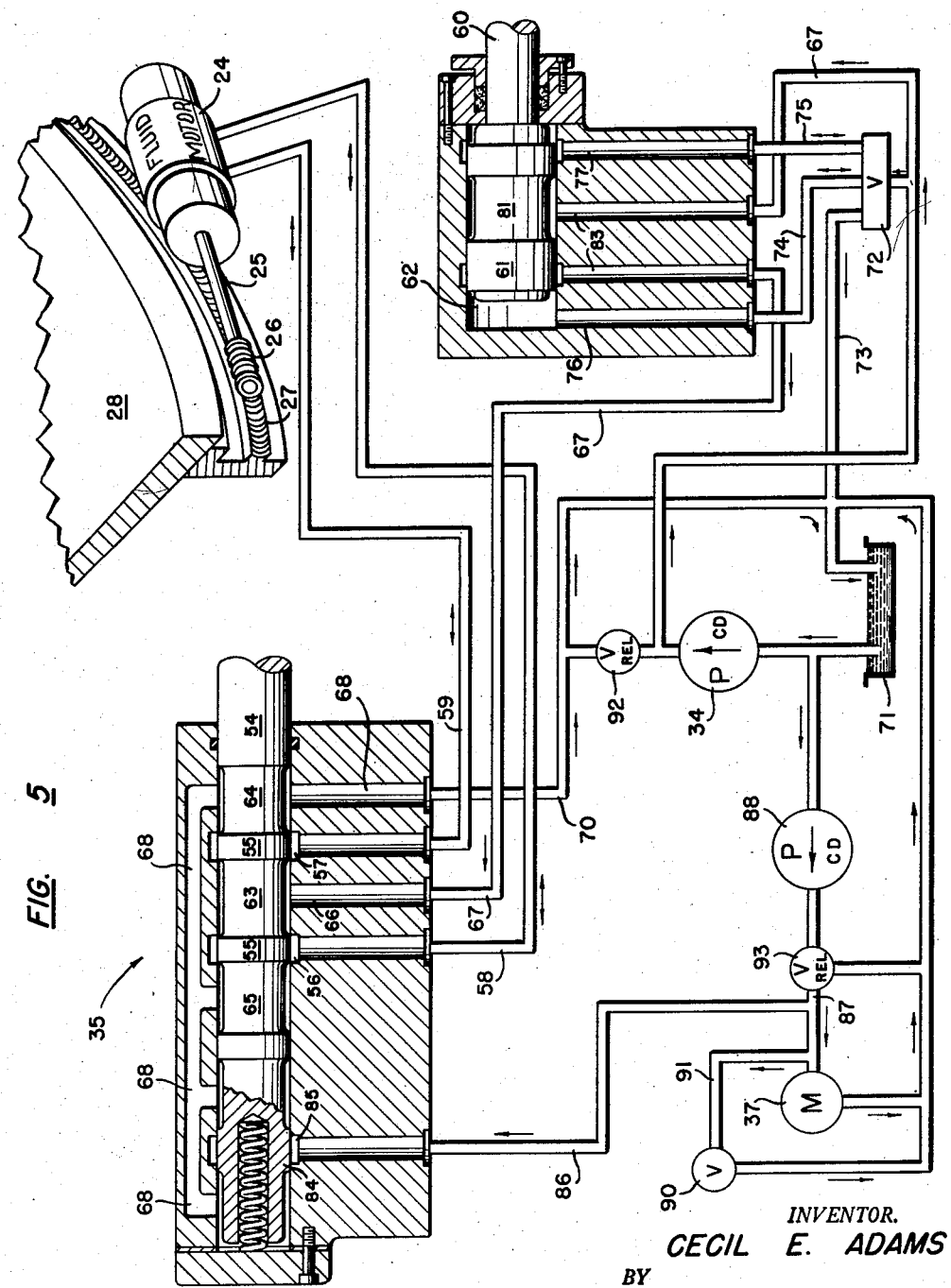
Fig. 5 is a diagrammatic view of a hydraulic system employed in the table shown in Fig. 1.

The speed of the motor 37 may be controlled by a throttle or flow control valve 90 which is arranged in a by-pass line 91 extending around the motor 37. Suitable relief valves 92 and 93 are arranged in the hydraulic system shown in Fig. 5 to prevent the generation of excessive pressures. These relief valves may be adjusted as usual to provide the optimum operating pressure.

From the foregoing it will be apparent that there has been provided a novel apparatus and hydraulic system for effecting the intermittent movement of a hydraulically operated device. While an index table has been chosen for illustration, it should be obvious that other devices could be provided with equal facility, the motor 24 being capable of driving any mechanism which will respond to rotary motion. The pilot operating mechanism controls the operation of the motor 24 causing the device driven thereby to duplicate the operation of the pilot mechanism.

While the invention has been illustrated in only one form, it should be obvious that many minor changes may be made therein without departing from the spirit and scope of the invention as set forth in the following claims.

I claim:

1. A hydraulically operated intermittently moving member comprising a motor; a rotatable member driven by said motor; control means for said motor including a valve; a plurality of meshing gears, one thereof being connected for rotation with said rotatable member, and another being connected with an element of said valve to impart movement thereto; a Geneva drive having a star wheel connected for rotation with a third gear of said plurality of meshing gears; a driver for intermittently rotating the star wheel of said Geneva; and a motor for driving the driver of said Geneva gearing.

2. A hydraulically operated intermittently movable member comprising a motor; a rotatable member connected for operation by said motor; means for intermittently supplying motivating force to said motor, said means having a Geneva drive with a driver and a star wheel; a train of at least three gears, one of said gears being connected for rotation with said rotatable member and another being connected for rotation with said Geneva star wheel, the third gear of said train floating between the other two gears; a valve for controlling the flow of motivating force to said motor, a movable element of said valve being connected for movement by said third gear; and a second motor for operating the driver of said Geneva gearing.

3. A hydraulically operated intermittently movable member comprising a fluid motor; a rotatable member connected for operation by said motor; means for controlling the flow of operating fluid to said motor, said means having a valve with a movable member; a Geneva drive with a star wheel and a driver; interengaging members connected with said rotatable member, the movable member of said valve, and the star wheel of said Geneva drive, differences in rates of movement of the interengaging members connected with said star wheel and said rotatable member causing the other interengaging member to react and move the movable member of said valve to control fluid flow to said motor; and a second motor for operating said Geneva driver.

4. A hydraulically operated intermittently movable device comprising a fluid motor; a rotatable member connected for operation by said motor; control valve mechanism for governing fluid flow from a pressure source to said fluid motor; an intermittently operated pilot member; and means between said valve mechanism and said pilot member and responsive to differences in rates of movement between said rotatable member and said pilot member for shifting said valve mechanism to control the operation of said fluid motor.

5. A hydraulically operated intermittently movable device comprising a fluid motor; a movable member connected for operation by said motor; control valve mechanism for governing fluid flow from a pressure source to said fluid motor; an intermittently operated pilot member; and means between said valve mechanism and said pilot member and responsive to differences in rates of movement between said movable member and said pilot member to shift said valve mechanism to control the operation of said fluid motor.

6. A hydraulically operated intermittently movable device comprising a fluid motor; a driven member connected for operation by said motor; lock means for holding said driven member against movement; control valve mechanism for governing fluid flow from a pressure source to said fluid motor; a pilot member; means for intermittently operating said pilot member; pressure responsive means operated by said pilot member operating means to release said lock means during operation of said pilot member and activate the same during stationary periods of said pilot member; and means between said valve means and said pilot member and responsive to differences in rates of movement between said driven member and said pilot member to shift said valve mechanism to control the operation of said fluid motor.

7. A hydraulically operated intermittently movable device comprising a fluid motor; a driven member connected for operation by said motor; control valve mechanism for governing fluid flow from a pressure source to said motor; a pilot member; means for intermittently operating said pilot member; means between said valve mechanism and said pilot member and responsive to differences in rates of movement between said driven member and said pilot member to shift said valve mechanism to control the operation of said fluid motor; and valve means operated in part by said pilot operating member and in part by fluid pressure to provide for fluid flow from a pressure source to said control valve mechanism during operation of said pilot member and to interrupt flow during stationary periods thereof.

8. A hydraulically operated movable device comprising a fluid motor; a movable member connected for operation by said motor; control valve mechanism for governing fluid flow from a pressure source to said fluid motor; a pilot member operated in accordance with a predetermined cycle pattern; and a means between said valve mechanism and said pilot member responsive to differences in rates of movement between said movable member and said pilot member to shift said valve mechanism to control the operation of said fluid motor.

9. A hydraulically operated movable device comprising a fluid motor; a movable member connected for operation by said motor; control valve mechanism for governing fluid flow from a pressure source to said fluid motor; a pilot member operated in accordance with a predetermined cycle pattern; means between said valve mechanism and said pilot member responsive to differences in rates of movement between said movable member and said pilot member to shift said valve mechanism to control the operation of said fluid motor; and fluid by-passing means responsive to excessive operation of said last-named means for unloading said pressure source.

10. A hydraulically operated movable device comprising a fluid motor; a movable member connected for operation by said motor; control valve mechanism for governing fluid flow from a pressure source to said fluid motor; a pilot member operated in accordance with a predetermined cycle pattern; a power source for operating said pilot member; means between said valve mechanism and said pilot member responsive to differences in rates of movement between said movable member and said pilot member to shift said valve mechanism to control the operation of said fluid motor; and safety means responsive to excessive operation of said last named means for unloading the power source for said pilot member.

11. A hydraulically operated movable device comprising a fluid motor; a source of fluid pressure; a movable member connected for operation by said motor; control valve mechanism for governing fluid flow from said fluid pressure source to said fluid motor; a pilot member operated in accordance with a predetermined cycle pattern; means between said valve mechanism and said pilot member responsive to differences in rates of movement between said movable member and said pilot member to shift said valve mechanism to control the operation of said fluid motor; locking means for holding said movable member stationary, said locking means being controlled by said pilot member; and safety means controlling the communication of said valve mechanism with said fluid pressure source, said safety means being operated by said pilot member simultaneously with said locking means.

CECIL E. ADAMS.

References Cited in the file of this patent

UNITED STATES PATENTS

| Number | Name | Date |
| --- | --- | --- |
| 1,923,204 | Hirvonen | Aug. 22, 1933 |
| 2,366,398 | Harrington | Jan. 2, 1945 |